United States Patent
Bliss (12)

(10) Patent No.: US 6,237,978 B1
(45) Date of Patent: May 29, 2001

(54) APPARATUS FOR RELEASING ITEMS WITHIN A CONFINED SPACE

(75) Inventor: George Nelson Bliss, Birmingham, MI (US)

(73) Assignee: Diamond Automations, Inc., Farmington Hills, MI (US)

( * ) Notice: Subject to any disclaimer, the term of this patent is extended or adjusted under 35 U.S.C. 154(b) by 0 days.

(21) Appl. No.: 09/484,340

(22) Filed: Jan. 18, 2000

Related U.S. Application Data

(63) Continuation-in-part of application No. 09/008,685, filed on Jan. 16, 1998, now Pat. No. 6,056,341.

(51) Int. Cl.[7] .................................................. B66C 1/42
(52) U.S. Cl. .............................................. 294/88; 294/106
(58) Field of Search ............................ 294/88, 106, 107, 294/87.12, 81.61, 67.31, 81.51, 86.41

(56) References Cited

U.S. PATENT DOCUMENTS

| | | | |
|---|---|---|---|
| 3,451,711 | 6/1969 | Carpenter | 294/113 |
| 3,608,950 | 9/1971 | Westbrand et al. | 294/88 |
| 4,133,570 | 1/1979 | Hammink et al. | 294/110.1 |
| 4,303,269 | 12/1981 | Faughnan | 294/88 |
| 4,648,646 | 3/1987 | Klupfel et al. | 294/106 |
| 4,765,487 | 8/1988 | Bliss | 209/510 |
| 5,330,242 | 7/1994 | Lucky, Sr. | 294/88 |
| 5,338,150 | 8/1994 | Focke et al. | 294/115 |
| 5,370,268 | 12/1994 | Adams | 294/115 |
| 5,398,983 | 3/1995 | Ahrens | 294/106 |
| 5,411,304 | 5/1995 | Muto et al. | 294/2 |
| 5,417,464 | 5/1995 | Seaberg et al. | 294/88 |
| 5,463,847 | 11/1995 | Alexander et al. | 294/119.1 |
| 5,486,030 | 1/1996 | Cobelo | 294/88 |
| 5,536,133 | 7/1996 | Velez et al. | 294/88 |
| 5,558,380 | 9/1996 | Meyer et al. | 294/88 |
| 5,562,320 | 10/1996 | Bloomberg et al. | 294/88 |
| 5,715,614 | * 2/1998 | Ookuwa et al. | 414/23 |

FOREIGN PATENT DOCUMENTS

| | | | |
|---|---|---|---|
| 24 40 199 | 8/1974 | (DE) | . |
| 0 167 138 | 6/1985 | (EP) | . |
| 0 666 149 A1 | 1/1995 | (EP) | . |
| 166475 | 11/1964 | (SU) | 294/106 |
| 839978 | 12/1977 | (SU) | 294/81.61 |
| 1110627 | 6/1983 | (SU) | 294/88 |
| 1615134 A1 | 1/1989 | (SU) | 294/106 |

* cited by examiner

*Primary Examiner*—Dean J. Kramer
*Assistant Examiner*—Paul T. Chin

(57) ABSTRACT

An automated actuation device for releasing items within a confined space, particularly an automated pickup head and gripping plate assembly which is used to grip egg cartons or trays and place those egg cartons or trays in stacks in a shipping container or basket. The actuation device includes a pickup head which may be mounted on any known or conventional apparatus for moving and orienting the pickup head and gripping plates to grasp individual items such as, e.g., egg cartons or trays, and to transfer those items to, and insert those items within, a confined space such as, e.g., a shipping container or basket. Mounted on the actuation device is a pickup head and gripping plate assembly. This assembly is actuated by an air cylinder connected to the assembly by a spider arm and an actuating bar. The gripping plate itself is connected to the pickup head by a first link and a second link. The first and second links are pivotally mounted on the pickup head, while an intermediate portion of the gripping plate is pivotally and slidably attached to the second link. A biasing element, attached on the second link, biases the gripping plate to an open position.

13 Claims, 5 Drawing Sheets

APPARATUS FOR RELEASING ITEMS WITHIN A CONFINED SPACE

RELATED APPLICATION

This application is a continuation-in-part of U.S. patent application Ser. No. 09/008,685, filed Jan. 16, 1998, and which is now U.S. Pat. No. 6,056,341.

BACKGROUND OF THE INVENTION

1. Field of the Invention

The present invention relates to an automated actuation device for releasing items within a confined space. In particular, the present invention relates to an automated pickup head and gripping plate assembly which is used to grip egg cartons or trays and place those egg cartons or trays in stacks in a shipping container or basket.

2. Description of the Art

Eggs are often packaged and sold in rectangular cartons containing a dozen or a dozen-and-a-half eggs (e.g., two or three rows of six eggs), which egg cartons are manufactured of a lightweight material such as polystyrene or cardboard. Eggs are also often shipped or processed using a generally square egg tray containing two-and-a-half dozen eggs (e.g., five rows of six eggs), which egg trays are generally manufactured of a pulp material or plastic. During a process of grading eggs at an egg farm or an egg processing plant, eggs are generally segregated according to, inter alia, size and condition, and are thereafter packed into the above-described egg cartons or trays. Usually, the egg cartons or trays are then stacked within larger shipping containers or wire plastic baskets for later transportation to a retail outlet. Because eggs are a fragile commodity, and because the egg cartons or trays into which eggs are shipped or processed are not particularly strong, it is necessary for the egg cartons or trays stacked in a shipping container or basket to be fairly tightly packed. Tight packing of egg cartons or trays in a shipping container or basket ensures minimum movement of the eggs and egg cartons or trays within the shipping container or basket, thereby reducing the chance of egg breakage during transportation.

Tight packing of egg cartons or trays within a shipping container or basket is generally accomplished using a shipping container or basket having very little clearance between the inside walls of the shipping container or basket and the outside edges of egg cartons or trays stacked therein. This small clearance can make gentle packing of egg cartons or trays, particularly those egg cartons or trays in the bottom of the shipping container or basket, difficult. Careful hand packing of the shipping containers or baskets can ensure gentle packing of egg cartons or trays within a shipping container or basket. However, hand packing of shipping containers or baskets reduces the speed at which the shipping containers or baskets may be packed, increases labor costs, and can result in repetitive motion injuries to the individuals doing the packing. It is therefore desirable to automate the process of packing shipping containers or baskets with egg cartons or trays. The limited clearance between the outside edges of egg cartons or trays being packed and the inside walls of the shipping container or basket severely limits the amount of space available for an automatic packing device to operate, presenting limitations on the design and operation of any automated packing apparatus. In particular, the limited clearance confines the dimensions of the packing device, which must be capable of being inserted within the interior of the shipping container or basket so as to prevent the need to drop cartons or trays into the bottom of the shipping container or basket. Furthermore, the limited clearance also confines the movement of the gripping structure on the packing device because the gripping structure must open to release the egg cartons or trays in the limited clearance between the outside edges of the egg cartons or trays and the inside walls of the shipping container or basket.

SUMMARY OF THE INVENTION

The present invention is an actuation device which allows the automatic gripping of items such as, e.g., egg cartons or trays, and the insertion of those items into a confined space such as, e.g., a shipping container or basket. The actuation device includes a linkage system which allows an entire pickup head and gripping plate assembly to be inserted into a confined space and thereafter the gripping plates to be retracted from the gripped item. As few as one and a maximum of two actuation devices are needed to grip and release items using the device of the present invention. The actuation device of the present invention therefore provides cost advantages over the prior art.

The actuation device may be mounted on any known or conventional apparatus for moving and orienting the pickup head and gripping plate assembly to grasp individual items and to transfer those items to, and insert those items within, a confined space. Connected to the pickup head and gripping plate assembly is an actuating device. The actuating device is made up of an air cylinder, spider arm and actuating bar. The actuating bar is connected to an pin connection of the pickup head. The pickup heads are connected to the gripping plates by a first link and a second link. Both the first links and the second links are pivotally mounted on the pickup head. Further, however, an intermediate portion of each gripping plate is not only pivotally attached, but slidably attached as well to the second link. A biasing element such as, e.g., a torsional spring, attached on the second link biases the plate away from the pickup head toward a fully open position. The lower end of the gripping plates are preferably slightly curved, and are used to grip the side and bottom of the items to be inserted and/or removed within the confined space.

In operation of present invention, the actuation device is moved to a position above, and aligned with, the group of items to be inserted into the confined space. The gripping plates are retracted to their fully open positions, so that the ends of the gripping plates are in their widest-apart position. In such a position, the pin, attaching the gripping plate to the second link, slides in the slot in the second link to its outwardmost position in the slot due to the biasing force applied by the biasing element. Thereafter, the actuation device is lowered to a position adjacent the group of items to be gripped. The gripping plates are then actuated to their fully closed positions. Such actuation of the gripping plates causes the first links to rotate downwardly, causing downward movement of the gripping plates as well as inward movement of the gripping plate ends as the result of the restraint imposed by second links. In the fully closed position of the actuation devices, the curved ends of the gripping plates extend underneath the items to thereby support the items vertically and horizontally.

The pickup head is then moved to a position above the shipping container or basket to be filled, and thereafter lowered. The items are lowered until they are placed on top of a previous layer of items, or in the case of the first layer of items, until they are placed on the bottom of the shipping container or basket. After the items are lowered to their desired position, the actuating devices are retracted. Retraction of the retraction devices causes the first links to pivot upwardly, drawing the upper ends of gripping plates upwardly and inwardly. The pins slide inwardly in the slots on second links as the intermediate portion of the gripping plate pivots outwardly, as the result of contact of the gripping plates with the inner wall of the shipping container or basket. This contact overcomes the bias of the biasing elements which normally bias the gripping plates outwardly. After the gripping plates reach their fully retracted position, the ends of the gripping plates are no longer under the items, and the actuation device may be lifted, while leaving the items within the shipping container or basket.

DETAILED DESCRIPTION OF THE INVENTION

Figure 1:
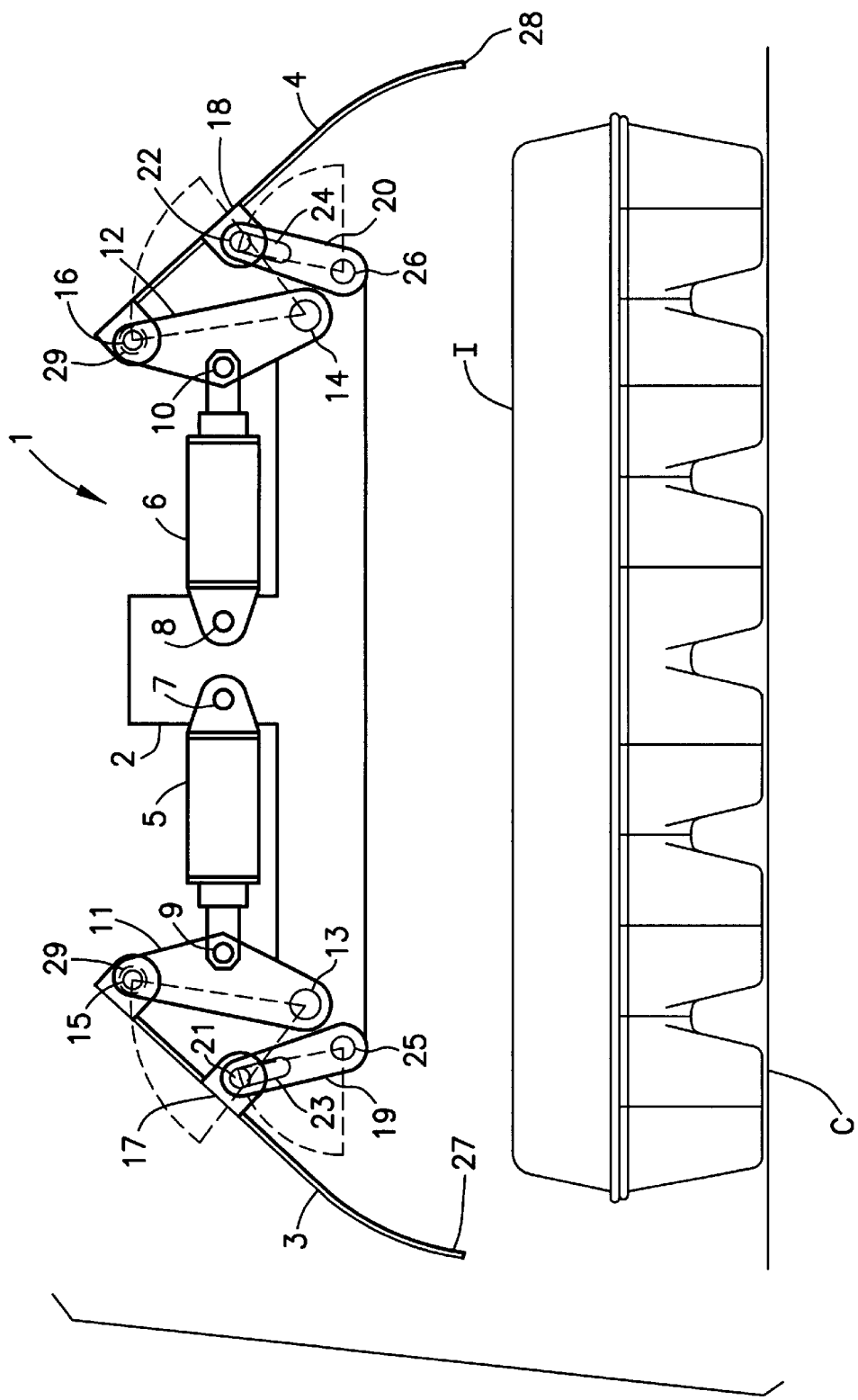
FIG. 1 illustrates a side view of the pickup head and gripping arm assembly in an open position before an item is gripped, according to an embodiment of the present invention.
Figure 2:
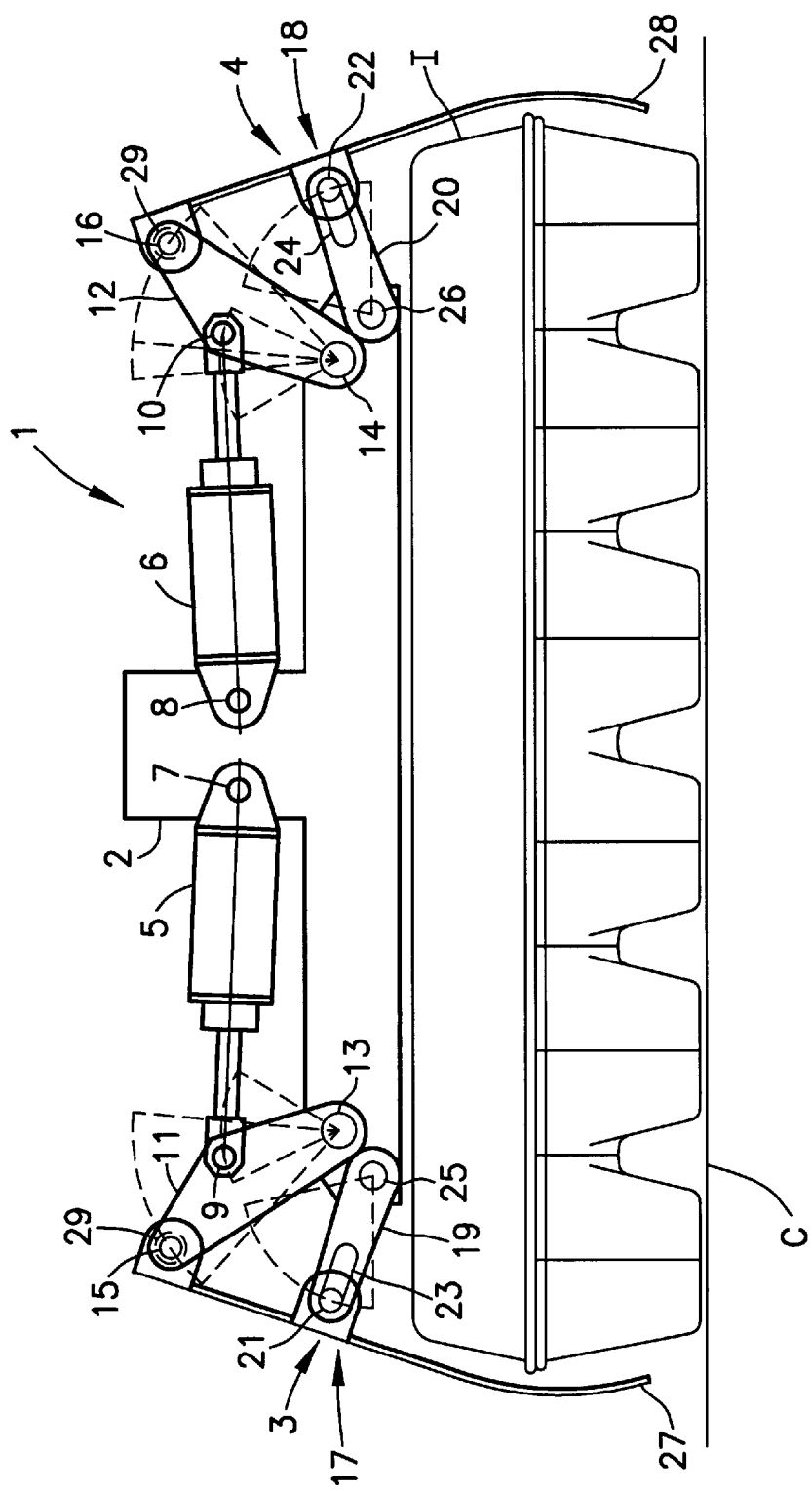
FIG. 2 illustrates a side view of the pickup head and gripping arm assembly in a partially-closed position during gripping of an item, according to an embodiment of the present invention.

FIGS. 1 and 2 are side views of a device 1 of the present invention, in an open position before an item I is gripped. Actuation device 1, in an embodiment, can be used to lift items I such as egg cartons or trays from, e.g., a conveyor C, and to insert the egg cartons or trays into a confined space, such as the interior of a shipping container or basket. Actuation device 1 can include a pickup head 2 which is normally connected to an automated device (not shown) for moving and orienting the pickup head 2 according to one or more degrees of freedom, including vertical and horizontal movement and rotation. In the position shown in FIG. 1, the gripping plates 3, 4 of actuation device 1 are in an open position, prior to lowering of pickup head 2 toward the item I to be gripped and closing of the gripping plates 3, 4 around the item I. In the open position, an actuation device such as, e.g., two air cylinders 5, 6, is in its fully retracted position. In order to grip the item I, the pickup head 2 is lowered from the position in FIG. 1 to the position in FIG. 2, wherein the pickup head 2 is adjacent the item I. Pickup head 2 is lowered using the automated device (not shown) described above, which moves the pickup head 2 vertically downward toward item I.

The actuation device is shown in FIGS. 1 and 2 as two air cylinders 5, 6, but could be any known device for pivoting links 11, 12 about pin connections 13, 14 such as, inter alia, one or more solenoids, linear or rotary motors, etc. In the an embodiment, the cylinders 5, 6 are pivotally mounted at one end to pickup head 2 using suitable pin connections 7, 8. The other end of cylinders 5, 6 are connected, using suitable pin connections 9, 10, to first links 11, 12. First links 11, 12 are pivotally mounted at one end to pickup head 2 using suitable pin connections 13, 14. Another end of first links 11, 12 is pivotally connected, using suitable pin connections 15, 16, to one end of gripping plates 3, 4. A biasing element 29, such as a torsional spring acting against both first links 11, 12 and the associated ends of gripping plates 3, 4, acts to normally bias gripping plates 3, 4 outward, to a fully open position (FIGS. 1 and 2). Intermediate portions 17, 18 of gripping plates 3, 4, are pivotally and slidably connected to second links 19, 20. Pins 21, 22 mounted on intermediate portions 17, 18 slide in slots 23, 24 in one end of second links 19, 20, and also allow relative rotation between second links 19, 20 and gripping plates 3, 4. The biasing devices 29 normally bias the gripping plates 3, 4 so that pins 21, 22 are at the outermost end of slots 23, 24 (FIGS. 1 and 2). Second links 19, 20 are pivotally mounted on pickup head 2 using suitable pin connections 25, 26.

Gripping plates 3, 4 are preferably constructed of a material such as, e.g., stainless steel, and are relatively thin to allow their insertion and removal within the limited space between the outer edges of the items I to be gripped and the inner walls of the space in which the items I are inserted. A lower end 27, 28 of gripping plates 3, 4 is preferably slightly curved. The slight curvature of lower ends 27, 28 allows them to project under the items I to be gripped, thereby supporting the items I for lifting and insertion. Gripping plates 3, 4 can be made to have a width greater than the width of the items I to be gripped, such that multiple items I can be gripped simultaneously. For example, the standard shipping container or basket for egg cartons or trays holds a stack of egg cartons or trays which is three dozen-egg cartons wide, two dozen-and-a-half-egg cartons wide, and one two-and-a-half-dozen-egg trays wide. The width (into the paper in FIGS. 1 and 2) of the gripping plates 3, 4 can therefore be equal to, or slightly less than, the width of three side-by-side dozen-egg cartons. The device 1 therefore may grip three dozen-egg cartons, two dozen-and-a-half-egg cartons, or one two-and-a-half-dozen-egg tray each time, thereby filling an entire layer in the shipping container or basket each time the actuation device 1 is inserted into the shipping container or basket. The pickup head 2 is preferably rotated 90° for each layer of egg cartons or trays inserted in the shipping container or basket. This arrangement of egg cartons or trays, increases the stability of the stacked egg cartons or trays within the shipping container or basket.

Figure 3:
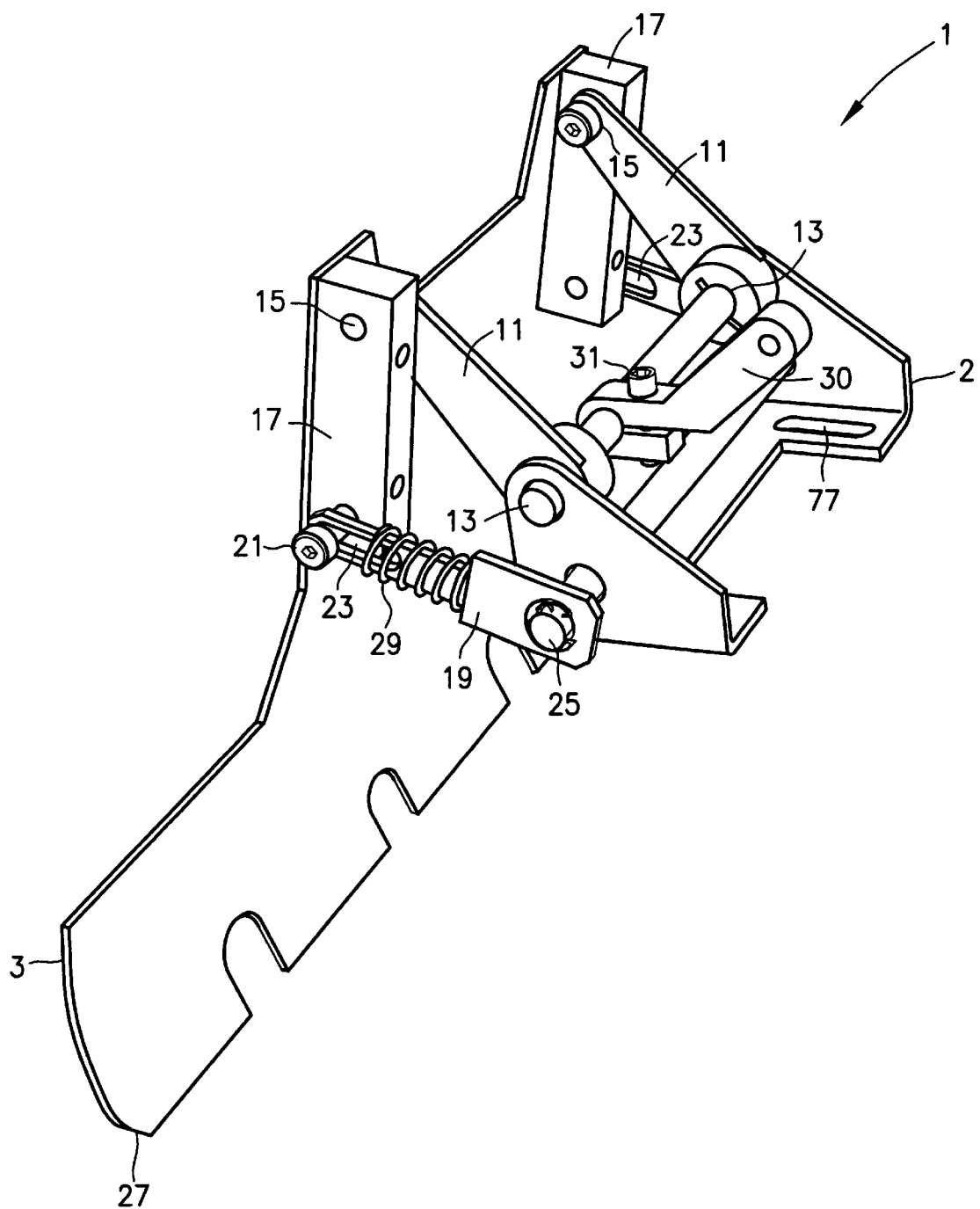
FIG. 3 illustrates an oblique side view of the pickup head and gripping arm, according to an alternate embodiment of the present invention.
Figure 4:
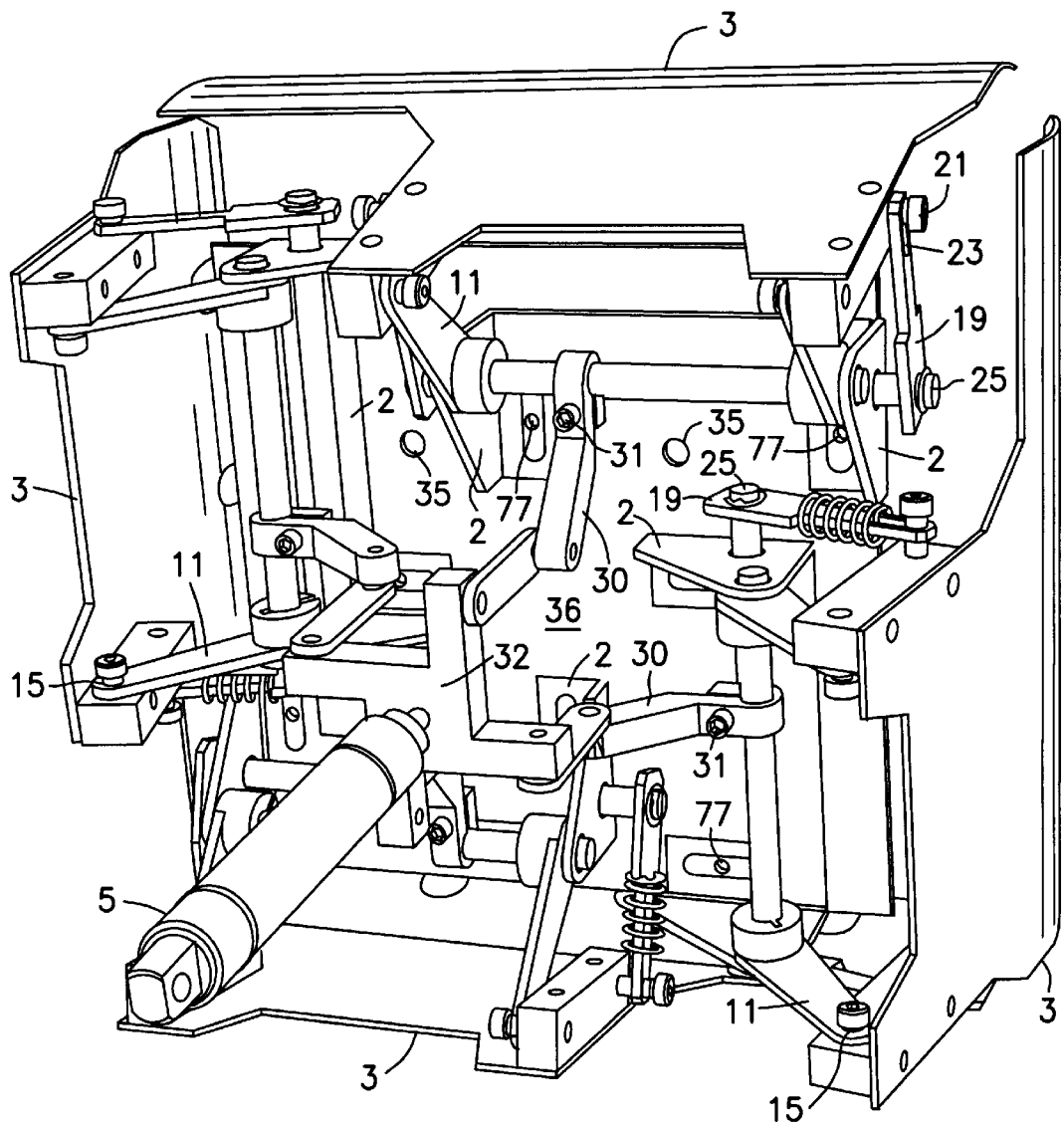
FIG. 4 illustrates a top view of the actuation device, according to an alternate embodiment of the present invention.

Referring now to FIGS. 3 and 4, an alternate embodiment of actuation device 1 is shown. In the alternate embodiment of actuation device 1, the shape and connection of pickup head 2 is different. That is, pickup head 2 is redesigned so that it connects to a base plate 36 of the automated device. Such connection is via a bolt (not shown) through bolt hole 77.

Further, in the alternate embodiment of actuation device 1, the placement and connection of air cylinder 5 is different. The redesign is such that the air cylinder 5 is no longer attached to either the pickup head 2 or the first link 11. Rather, the air cylinder 5 is connected at one end to a spider arm 32 and at the other end to a frame 33. Spider arm 32 connects to an actuating bar 30, which is then connected to pin connection 13. Such connection can be by such means as a hooked end wrapped around the pin connection and secured in place by bolt 31. Correspondingly then, pin connection 9 to first link 11 is no longer necessary, and the first link 11 may be, but need not be, reshaped to use less material. Furthermore, pin connection 15 can now be secured such that first link 11 no longer rotates about this pin connection. It is to be understood, of course, that connection of actuating bar 30 to pin connection 13 need not be in the manner disclosed, but may be in any manner in which the two are securely connected.

Figure 5:
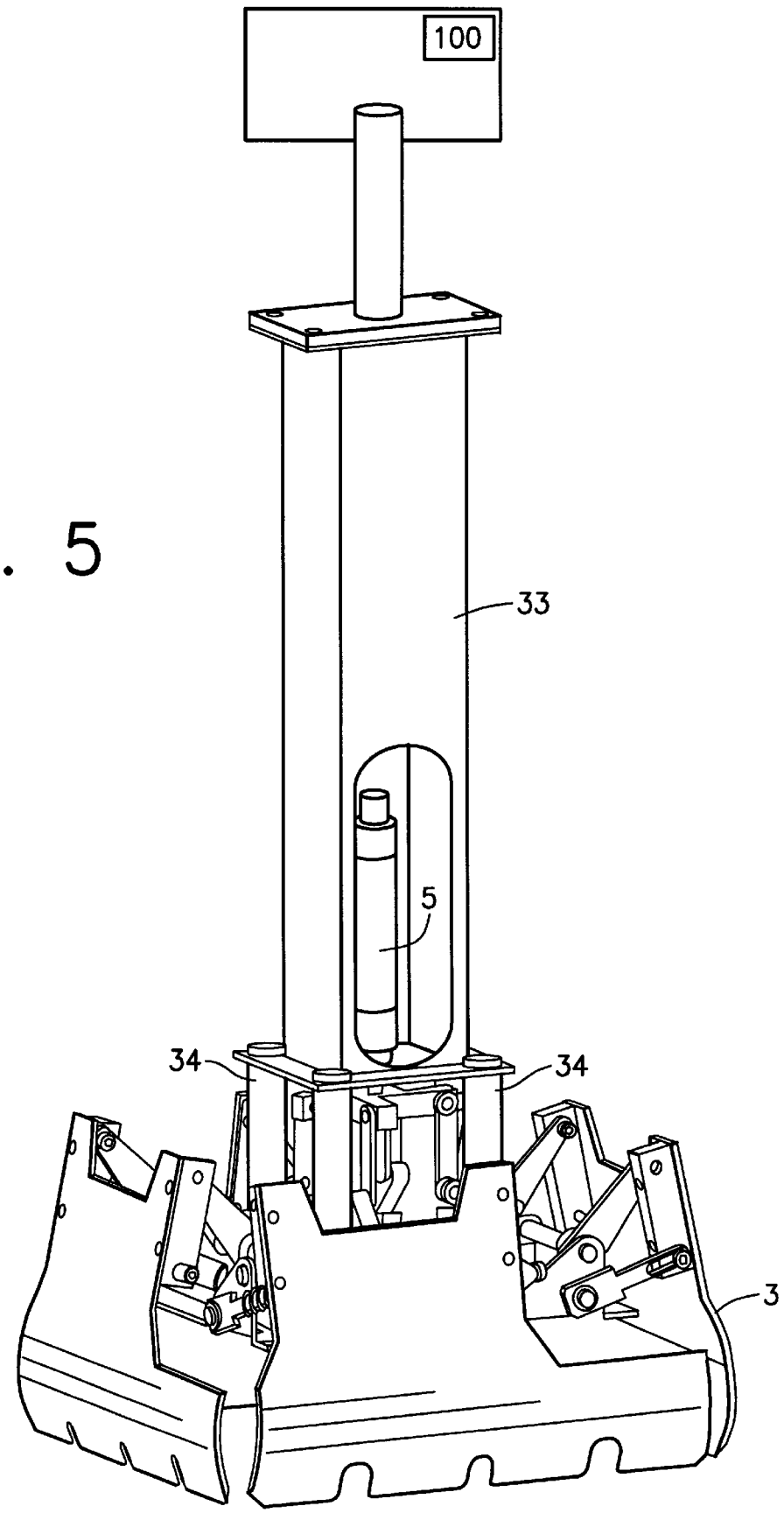
FIG. 5 illustrates a side view of the actuation device, according to an alternate embodiment of the present invention.

Referring now to FIG. 5, the frame 33 is bolted to base plate 36 by four support bars 34 bolted through four holes 35 drilled through base plate 36. The movement and positioning of frame 33 is then controlled accordingly by further connections (not shown). Such construction of the frame 33 and a centrally placed connection of air cylinder 5 to a spider arm 32, instead of having a different air cylinder connected directly to each actuation device 1, allows for fewer air cylinders.

Operation of the actuation device 1 of the present invention is as follows. A group of items I such as egg cartons or trays are conveyed down a conveyor C to a pickup location. The actuation device 1 is moved to a position above, and aligned with, the group of items I, as shown in FIG. 1. This movement is accomplished by any known or conventional apparatus (not shown) for horizontally, vertically, and rotationally moving the actuation device 1. If not accomplished already, a controller 100 for the actuation device 1 operates to extend the air cylinders 5 to move gripping plates 3 and 4 in their widest-apart position from each other, while pin 21 is biased by biasing device 29 to the outward end of slot 23. Thereafter, pickup head 2 and gripping plate 3 assemblies are lowered to a position adjacent the group of items I to be gripped. The controller (not shown) thereafter activates the air cylinder 5 to its fully retracted position. Retraction of air cylinder 5 causes spider arm 32 to move upwardly, thus causing actuating bar 30 to rotate pin 13. Correspondingly, this rotational movement causes first link 11 to rotate downwardly around pin connection 13. Downward rotation of first link 11 results in downward movement of gripping plate 3, as well as an inward movement of gripping plate end 27 as the result of the restraint imposed by second link 19. In the fully retracted position of air cylinder 5, curved end 27 of gripping plate 3 extends underneath item I to thereby support item I vertically and horizontally in conjunction with gripping plate 4. In this position, pin 21 continues to be biased by biasing device 29 to the outward end of slot 23.

The actuation device 1 is then moved to a position above the shipping container or basket to be filled, and on alternating layers is rotated by 90°. The actuation device 1 is centered over the space to be filled, and the pickup head 2 and gripping arms 3 and 4 are thereafter lowered using a conventional or known apparatus (not shown) for effecting vertical movement. Because the outside surfaces of the gripping plates 3, 4 are the furthest lateral extent of the actuation device 1, the device 1 can be lowered completely within the inside walls of the shipping container or basket. The items I are lowered until they are placed on top of a previous layer of items, or in the case of the first layer of items I, until they are placed on the bottom of the shipping container or basket.

After the items I held by the actuation device 1 are lowered to their desired position, the controller (not shown) controls the air cylinder 5 to cause it to extend. Extension of the air cylinder 5 causes the first link 11 to pivot upwardly around pin connection 13, drawing the upper end of gripping plate 3 upwardly and inwardly and the lower end 27 of gripping plate 3 upwardly and outwardly. Pin 21 slides inwardly in slot 23 due to contact of the outside of gripping plate 3 with the inside wall of the container. This contact, and the resulting force, overcomes the bias of biasing element 29, resulting in sliding movement of end 27 of gripping plate 3 along the outside edges of the item I. Outward movement of the gripping plates 3 during retraction is restrained by contact with the container walls and compensated for by sliding of pin 21 in slot 23. The sliding motion of gripping plate 3 does not interfere with release of the item I within the shipping container or basket. After the air cylinder 5 reach their fully extended position, the end 27 of gripping plate 3 is no longer under the item I, and the pickup head 2 and gripping plate 3 assembly may be lifted, while leaving the item I within the shipping container or basket. When the end 27 of gripping plate 3 clears the upper end of container walls during lifting of the actuation device 1, the biasing force of biasing element 29 causes the pin 21 to snap outwardly in slot 23 so that the actuation device 1 assumes the position shown in FIG. 1.

The present invention contemplates a number of different variations on the above-described embodiments. For example, the present invention need not be used for releasing egg cartons or trays within a shipping container or basket, but can be used to grip and release any item for which such action is accomplished within a confined space. In addition, the device of the present invention could be used for removing items from a confined space. As will be understood by one of ordinary skill in the art, using the device of the present invention to remove items will require merely reversing the sequence of operation described above, with the additional step of slightly closing the gripping plates before insertion into the confined space, with later opening of the gripping plates so that the ends of the gripping plates contact the walls of the confined space. It is to be understood that the above description is not to be considered limiting, and that the scope of the invention is to be measured by the claims as set forth below.

What is claimed is:

1. An actuation apparatus for gripping and releasing items, the apparatus comprising:
   a pickup head;
   a gripping plate, connected to the pickup head by a first link and a second link, the first link being rotatable around a first pin connection and the second link being rotatable around a second pin connection, such that the gripping plate can move between an open position and a closed position and, while in the closed position, support the items both horizontally and vertically; and
   a reciprocating actuator drive member, connected at a first end to the gripping plate by means of a spider arm and an actuating bar, movement of which causes the gripping plate to rotate around the first pin connection and the second pin connection and thus into the open and closed positions,
   wherein the second link has a slot in which a pin that connects the second link to the gripping plate can slide in a direction towards and in a direction away from the pickup head, dependent upon the greater of a biasing force applied by a biasing element in the direction away from the pickup head and a force applied in the direction towards the pickup head by a combination of the movement of the actuation device upwards and out of a container and the gripping plates contact with an inside wall of that container.

2. The apparatus according to claim 1, further comprising:
   a base to which the pickup head is fastened.

3. The apparatus according to claim 1, further comprising:
   a frame to which the reciprocating actuator drive member is connected at a second end.

4. The apparatus according to claim 1, further comprising:
   at least one support bar connecting a frame, to which the reciprocating actuator drive member is connected at a second end, to a base, to which the pickup head is fastened.

5. The apparatus according to claim 1, further comprising:

a biasing element, attached to the second link and which applies a biasing force to keep the second link in its outermost position.

6. The apparatus according to claim 1, wherein the actuating bar is connected to the first pin connection.

7. The apparatus according to claim 1, wherein an end of the gripping plate is curved.

8. The apparatus according to claim 1, further comprising:

a controller for controlling movement of the reciprocating actuator drive member.

9. An actuation apparatus for gripping and releasing items within a confined space, the apparatus comprising:

at least one pickup head;

at least one gripping plate, capable of supporting the items both horizontally and vertically;

at least one pair of first links pivotally connecting the at least one pickup head to the at least one gripping plate, the at least one pair of first links connected to the at least one pickup head by a first rotatable pin connection;

at least one pair of second links pivotally connecting the at least one pickup head to the at least one gripping plate, the at least one pair of second links connected to the at least one pickup head by a second rotatable pin connection, and the at least one pair of second links connected to the at least one gripping plate by a third slidable pin connection fitting into a slot in the at least one pair of second links;

an actuating bar connected to the first rotatable pin connection;

a spider arm connected to the actuating bar; and an reciprocating actuator drive member, connected at a first end to the spider arm, the reciprocating actuator drive member capable of movement between an extended position and a retracted position, wherein when the reciprocating actuator drive member moves into the retracted position, the at least one gripping plate moves to grip the item, and wherein when the reciprocating actuator drive member moves into the extended position, the at least one gripping plate moves to release the item.

10. The apparatus according to claim 9, further comprising:

a biasing element which biases the third pin connection to an outermost position in the slot.

11. The apparatus according to claim 9, further comprising:

a frame, to which the reciprocating actuator drive member is connected at a second end.

12. The apparatus according to claim 9, further comprising:

a base to which the at least one pickup head and a frame are bolted.

13. The apparatus according to claim 9, further comprising:

a controller for controlling movement of the reciprocating actuator drive member.

* * * * *